INVENTOR.
ADOLF MAIER

United States Patent Office 3,339,520
Patented Sept. 5, 1967

3,339,520
POINTER ASSEMBLY
Adolf Maier, St. Georgen, Black Forest, Germany, assignor to Firma Prazisions Erzeugnisse A. Maier KG, St. Georgen, Black Forest, Germany
Filed July 19, 1966, Ser. No. 566,368
Claims priority, application Germany, May 20, 1966, P 39,497
7 Claims. (Cl. 116—136.5)

ABSTRACT OF THE DISCLOSURE

A pointer assembly adapted to be mounted as a unit on a measuring instrument. The assembly includes a rotary support in the form of a tubular sleeve which is to be fixed on the shaft of the instrument. This rotary support fixedly carries a gear which is coaxial with the rotary support, and in front of the gear is located a pointer which is freely turnable on the rotary support. The pointer is formed with an opening through which extends a shaft which is fixed to a second gear which meshes with the gear which is fixed to the rotary support, and at the front of the pointer the shaft which is fixed to the second gear carries a manually engageable means enabling the operator to turn the second gear so as to change the angle of the pointer with respect to the rotary support. The frictional engagement between the components of the pointer assembly is sufficient to maintain the pointer in its adjusted position without requiring the use of any structure for tightening the pointing in its adjusted position.

---

Figure 1:
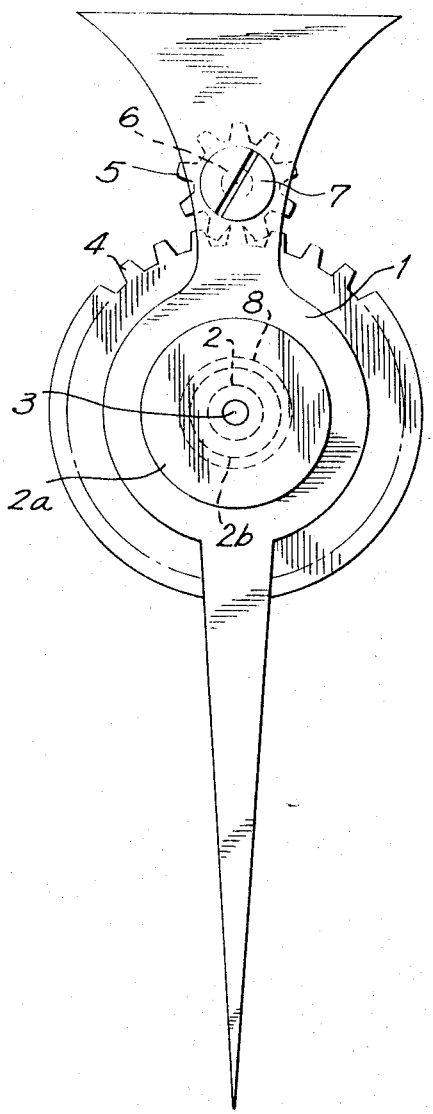

The present invention relates to measuring instruments of all types and in particular to pointer assemblies of such instruments.

As is well known, pointer assemblies of this type must be adjusted with respect to the instrument, and for this purpose there are well-known zeroing or correcting devices connected with the instrument pointer so as to initially situate the latter at such position that during he operation of the instrument a correct reading can be achieved from the pointer. This adjustment of the pointer with respect to the instrument is brought about by mounting the pointer for angular movement with respect to a stationary point situated at the exterior of the pointer, so that in this way the angular position of the pointer can be adjusted. Also, it is possible to adjust a scale of the instrument with respect to the entire instrument, including the pointer thereof. These known structures are expensive, do not provide a particularly accurate adjustment of the pointer, and require considerable expense in their mounting on the instrument inasmuch as they must be assembled with an instrument which is almost completed.

In those instruments where the pointer is simply mounted on a shaft of the instrument, the adjustment of the angular position of the pointer requires removing the pointer from the shaft or at least loosening its connection to the shaft and then repositioning the pointer with respect to the shaft in a loose condition where the pointer has a proper angular position, after which the pointer is then tightened onto the shaft so as to maintain its adjusted position. These operations of course cannot be carried out with a high degree of accuracy, and in addition there is the danger that the instrument shaft which carries the pointer will become damaged because of the repeated loosening and tightening of the pointer thereon.

It is accordingly a primary object of the present invention to provide a pointer assembly which will avoid the above drawbacks.

More specifically, it is an object of the present invention to provide for measuring instruments a pointer assembly which can be very easily and quickly adjusted with a high degree of accuracy.

In addition, it is an object of the present invention to provide a pointer assembly which is composed of a relatively small number of elements, which is light in weight, and which is inexpensive to manufacture.

Furthermore, it is anobject of the present invention to provide a pointer assembly which includes structure for adjusting the position of the pointer with respect to the instrument and which in addition can be manufactured in its entirely completely apart from the remainder of the instrument, so that the pointer and the structure for adjusting the latter will, in accordance with the invention, form an independent subassembly which can be mounted as a unit on the instrument.

In particular, it is an object of the present invention to provide a pointer assembly of the above type which need only be mounted on a shaft of the instrument to be assembled therewith, this assembly remaining permanently connected with the shaft while permitting adjustment of the pointer with respect to the instrument to be carried out. However, it is to be understood that the mounting of the assembly of the invention on the pointer shaft of the instrument is not essential to the invention and that the pointer can be connected in any desired manner to the pointer shaft of the instrument.

In accordance with the invention, the pointer assembly includes a pointer and an adjusting means operatively connected thereto for adjusting its angular position with respect to the instrument, and in accordance with the invention this adjusting means which is operatively connected to the pointer is carried in its entirety by the pointer itself. The adjusting means includes a rotary support turnably carrier by the pointer and with respect to which the pointer is turnable, and this rotary support is itself formed with a bore for receiving the pointer shaft of the instrument so that by fixing the rotary support on the pointer shaft of the instrument the pointer itself is connected to the instrument for turning movement with respect thereto. The adjusting means includes, furthermore, a manually operable drive transmission extending between and operatively connected to the rotary support and the pointer so that by operating this drive transmission it is possible to angularly adjust the pointer and the rotary support one with respect to the other. Of course, the rotary support defines the turning axis of the pointer.

Figure 2:
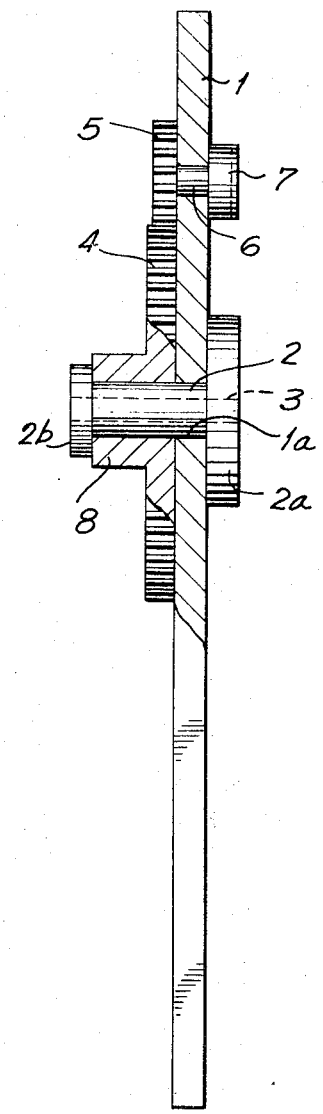

The invention is illustrated by way of example in the accompanying drawings which form part of the application and in which:

FIG. 1 is a front elevation of one possible embodiment of a pointer assembly according to the invention; and FIG. 2 is a partly sectional side view of the assembly of FIG. 1, those parts which are shown in section in FIG. 2 being illustrated in a sectional plane which includes the axis of the pointer.

Referring now to the drawings, the pointer 1 which is illustrated therein has a front face which is visible in FIG. 1 and a rear face which is situated at the left side of the pointer 1, as viewed in FIG. 2. The adjusting means for adjusting the angular position of the pointer with respect to the instrument is carried in its entirety by the pointer itself, and this adjusting means includes a rotary support 2 is the form of a tubular sleeve extending through an opening 1a of the pointer so that the latter and the tubular sleeve are turnable one with respect to the other about the axis of the rotary support 2, this latter axis defining the turning axis of the pointer 1. The rotary support 2 is formed with an axial bore 3 passing completely therethrough and having an axis coinciding with the turning axis of the pointer, and it is this bore 3 which is adapted to receive the pointer shaft of the instrument, the rotary support 2 being fixedly mounted on the pointer shaft of the instrument. As is apparent from FIG. 2, the rotary support 2 has at its front end a flange 2a which engages the front face of the pointer 1 and at its rear end a rear flange 2b spaced rearwardly from the rear face of the pointer 1.

The adjusting means of the invention further includes a manually operable drive transmission extending between and operatively connected with the rotary support 2 and the pointer 1 so that upon manual operation of this drive transmission the angular position of the pointer 1 and the rotary support 2, one with respect to the other, can be adjusted. This manually operable drive transmission includes a gear 4 which coaxially surrounds and is fixed to the rotary support 2 at the rear of the pointer 1. It is to be noted that this gear 4 which is fixed to the rotary support 2 has an elongated tubular hub 8 extending from the gear portion of the gear 4, which is situated directly next to the rear face of the pointer 1, up to the rear flange 2b of the sleeve 2, so that in this way while the rotary support 2 and the pointer 1 are freely turnable one with respect to the other, it is not possible for the rotary support 2 and the pointer 1 to move axially one with respect to the other.

The drive transmission further includes a gear 5 which meshes with the gear 4, and the pointer 1 is formed with an opening situated coaxially with the gear 5 and through which a shaft 6 extends, this shaft 6 being fixed to the gear 5 so that the latter will turn in response to turning of the shaft 6. At the front face of the pointer 1 the shaft 6 is fixed with a manually engageable portion 7 of the drive transmission, this manually engageable portion 7 preferably taking the form of a grooved head member capable of receiving the tip of a screwdriver by means of which it is possible to turn the gear 5, although it is also possible to give the manually engageable portion 7 the form of a knob which can be manually grasped by the operator. The use of a grooved head which can be turned by a screwdriver is preferred because of the greater accuracy which can be achieved by adjusting the structure in this way. The right face of the gear 5, as viewed in FIG. 2, engages the rear face of the pointer 1, while the left face of the manually engageable portion 7, as viewed in FIG. 2, engages the front face of the pointer 1, so that in this way axial displacement of the gear 5 and the manually engageable portion 7 with respect to the pointer 1 is prevented.

The above-described structure operates in the following manner:

Assuming that the rotary support 2 is mounted on the pointer shaft of the instrument, and that it is required to adjust the angular position of the pointer, then it is only necessary to apply the tip of a screwdriver to the manually engageable portion 7 so as to turn the latter. This turning movement is transmitted by way of the shaft 6 to the gear 5, which rides around the gear 4, thus causing the pointer 1 to turn about the rotary support 2. In this way the required adjustment of the position of the pointer 1 can be achieved. Of course, when the assembly is separated from the instrument, before it is joined thereto, as shown in FIGS. 1 and 2, turning of the manually engageable portion 7 will result in turning of the rotary support 2 with respect to the pointer 1.

The gear 4 is preferably formed integrally with its hub 8, and because of the increased length of the sleeve 2 which is achieved by this construction, a very reliable mounting of the entire assembly on the pointer shaft of the instrument is achieved.

Furthermore, it is preferred to provide the gear 5 with a number of teeth which is substantially less than the number of teeth of the gear 4, so that in this way a very high degree of accuracy in the adjustment of the position of the pointer 1 can be achieved.

It will be noted that with the structure of the invention there is no requirement of tightening the pointer in its adjusted position. Because of the slidable engagement of the components of the drive transmission of the invention, these components frictionally contact each other with a friction which is sufficient to maintain the pointer reliably in its adjusted position without requiring the use of any tightening structure for this purpose. As a result it becomes possible for the operator at any time to adjust the position of the pointer without first loosening a structure which rigidly maintains the pointer fixed in its adjusted position, and of course without tightening such a structure after the adjustment is made.

Thus, it will be seen that this high degree of accuracy in the adjustment of the pointer can be achieved with the structure of the invention even though the entire assembly which includes the pointer and its adjusting structure can be manufactured as a separate subassembly completely independent of the remainder of the instrument before being assembled with the latter. Furthermore, it will be seen that the structure of the invention requires only two members to be turnably connected with the pointer, one of these members being adapted to be fixed to the pointer shaft of the instrument and the other of the members being adapted to be manually turned, and simply by connecting these two members with a pair of gears which mesh with each other it is possible to achieve the above results of the invention.

What is claimed is:

1. A pointer assembly for a measuring instrument or the like, comprising a pointer and adjusting means operatively connected to the pointer for angularly adjusting the latter with respect to an instrument which carries the pointer, said adjusting means being carried in its entirety by said pointer and including a rotary support defining a turning axis for the pointer and rotatably carried by said pointer, said rotary support being adapted to be fixedly mounted on a shaft of the measuring instrument to support the pointer for turning movement with the latter shaft, and said adjusting means further including a manually operable drive transmission extending between and operatively connected with said pointer and said rotary support for turning said pointer and rotary support one with respect to the other, said drive transmission having components which frictionally engage each other with a force of friction sufficient to maintain the pointer in its adjusted position without requiring the use of any additional structure, so that the pointer is maintained in its adjusted position exclusively by the components of said drive transmission.

2. An assembly as recited in claim 1 and wherein said drive transmission includes a pair of gears which mesh with each other, one of said gears being fixed to said rotary support and the other of said gears being turnably connected with said pointer for turning movement with respect thereto about an axis parallel to the turning axis provided by said rotary support, and said transmission including a manually engageable portion operatively connected to said other gear for manually turning the latter to angularly displace said pointer and said rotary support, one with respect to the other.

3. An assembly as recited in claim 2 and wherein said pointer has front and rear faces, and said manually engageable portion of said transmission being accessible at said front face of said pointer.

4. An assembly as recited in claim 3 and wherein said manually engageable portion of said transmission is in the form of a grooved head member adapted to be turned by the tip of a screw driver.

5. An assembly as recited in claim 2 and wherein said other gear has a number of teeth which is substantially less than the number of teeth of said one gear.

6. A pointer assembly for a measuring instrument or the like, comprising a pointer and adjusting means operatively connected to the pointer for angularly adjusting the latter with respect to an instrument which carries the pointer, said adjusting means being carried in its entirety by said pointer and said adjusting means including a rotary support turnably carried by said pointer, said rotary support being in the form of a tubular sleeve extending through said pointer, and with respect to which said pointer is turnable, said pointer having front and rear faces, and said sleeve having an outwardly directed flange at one end of said sleeve engaging said front face of said pointer, said sleeve having a rear flange, at a rear end of said sleeve, spaced rearwardly from the rear face of said pointer, and said adjusting means including a gear fixedly carried by said sleeve at the rear of said pointer and extending between said rear face of said pointer and said rear flange of said sleeve, so that while said sleeve and pointer are turnable one with respect to the other, said sleeve and pointer are prevented from moving axially one with respect to the other, said sleeve being adapted to be fixedly mounted on a shaft of the measuring instrument, a second gear situated at the rear face of said pointer and meshing with said gear which is fixed to said sleeve, said pointer being formed with an opening situated coaxially with respect to said second gear, and a shaft fixed to said second gear and extending therefrom through said opening of said pointer which is coaxial with said second gear so that said second gear is turnable with respect to said pointer, and a manually engageable portion fixed to said shaft at the front face of said pointer so that said shaft and second gear can be manually turned for turning said gear fixed to said sleeve and said sleeve therewith, whereby when said sleeve is mounted on an instrument shaft turning of said second gear will result in turning of said pointer and sleeve one with respect to the other.

7. An assembly as recited in claim 6 and wherein said gear which is fixed to said sleeve includes a gear portion situated in the immediate vicinity of the rear face of said pointer and a tubular hub portion extending rearwardly from said gear portion up to said rear flange of said sleeve.

References Cited

UNITED STATES PATENTS

| | | | |
|---|---|---|---|
| 1,028,540 | 6/1912 | Chatillon | 116—129 |
| 2,319,782 | 5/1943 | Rourke | 116—136.5 |
| 2,982,086 | 5/1961 | Loretan | 58—111 |
| 3,032,004 | 5/1962 | Keeling | 116—129 |
| 3,087,380 | 4/1963 | Greger et al. | 116—136.5 |

FOREIGN PATENTS 283,816    10/1952    Switzerland.

LOUIS J. CAPOZI, *Primary Examiner.*